US012515869B2

(12) United States Patent
Sirmon et al.

(10) Patent No.: US 12,515,869 B2
(45) Date of Patent: Jan. 6, 2026

(54) DEHUMIDIFICATION CONTAINER WITH LID POWER SUPPLY

(71) Applicant: Mazarine, Inc., Panama City Beach, FL (US)

(72) Inventors: Levi. D. Sirmon, Defuniak Springs, FL (US); Jamin A. Finlaw, Panama City Beach, FL (US)

(73) Assignee: Mazarine, Inc., Panama City Beach, FL (US)

( * ) Notice: Subject to any disclaimer, the term of this patent is extended or adjusted under 35 U.S.C. 154(b) by 370 days.

(21) Appl. No.: 18/119,146

(22) Filed: Mar. 8, 2023

(65) Prior Publication Data

US 2024/0300723 A1 Sep. 12, 2024

(51) Int. Cl.
*B65D 81/26* (2006.01)

(52) U.S. Cl.
CPC ........ *B65D 81/263* (2013.01); *B65D 2205/02* (2013.01)

(58) Field of Classification Search
CPC .... B65D 81/263; B65D 81/18; B65D 81/262; B65D 2205/02; B01D 53/261; F24F 3/14; F24F 2110/22; F24F 2003/144
See application file for complete search history.

(56) References Cited

U.S. PATENT DOCUMENTS

| | | | | | |
|---|---|---|---|---|---|
| 5,089,035 | A * | 2/1992 | Kaneko | ................ | B01D 53/261 95/91 |
| 5,153,561 | A * | 10/1992 | Johnson | ............... | G08B 13/149 70/278.1 |
| 5,444,984 | A * | 8/1995 | Carson | .................... | F25B 21/02 62/3.4 |
| 6,021,642 | A * | 2/2000 | Guinn | .................... | A45C 5/005 62/235.1 |
| 6,305,185 | B1 * | 10/2001 | Sloan | .................... | A45C 15/00 62/235.1 |
| 6,725,598 | B2 * | 4/2004 | Yoneda | ................. | A01G 31/02 47/60 |
| 7,513,385 | B2 * | 4/2009 | Flynn | ....................... | H02G 9/10 220/484 |
| 8,067,715 | B2 * | 11/2011 | Peterson | ................. | B25H 3/02 219/217 |
| 9,792,748 | B2 * | 10/2017 | Campalans | ............ | H04L 67/01 |
| 10,034,435 | B2 * | 7/2018 | Helene | ................... | A01G 31/06 |
| 11,160,409 | B2 * | 11/2021 | Bowman | ............... | A47G 29/30 |

(Continued)

FOREIGN PATENT DOCUMENTS

| | | | | |
|---|---|---|---|---|
| EP | 2642018 A2 * | 9/2013 | ............ | D06F 58/20 |
| JP | 2003042510 A * | 2/2003 | | |

(Continued)

*Primary Examiner* — Nathan C Zollinger
(74) *Attorney, Agent, or Firm* — AdamsIP, LLC

(57) ABSTRACT

Storage containers include a body with a cavity and a lid having an internal space, connected at an edge to the body. A dehumidifier is within the cavity and is configured to dehumidify air within the cavity. An air stream is created and then split such that dehumidified air is returned to the cavity and wet air is expelled from the system. Electrical features such as the dehumidifier, lighting or lid actuators, are powered by a power source within said internal space. In some embodiments, the power source is a battery and a lid mounted solar panel provides an electrical charge to said battery.

15 Claims, 11 Drawing Sheets

(56) References Cited

U.S. PATENT DOCUMENTS

| | | | | |
|---|---|---|---|---|
| 11,203,465 | B2* | 12/2021 | Seiders | E05B 65/5207 |
| 12,339,033 | B2* | 6/2025 | Finlaw | B65D 81/263 |
| 2008/0282704 | A1* | 11/2008 | Shalom | F24F 3/14 |
| | | | | 62/3.4 |
| 2010/0000413 | A1* | 1/2010 | Turner | A61L 9/122 |
| | | | | 55/471 |
| 2010/0012739 | A1* | 1/2010 | Hoeth | G10G 7/00 |
| | | | | 236/44 C |
| 2014/0123513 | A1* | 5/2014 | Ciffin | G10G 7/005 |
| | | | | 34/82 |
| 2020/0323245 | A1* | 10/2020 | Le | A23B 2/001 |
| 2022/0154950 | A1* | 5/2022 | Finlaw | F24F 3/14 |
| 2023/0194107 | A1* | 6/2023 | Finlaw | B65D 81/263 |
| | | | | 34/79 |
| 2023/0419240 | A1* | 12/2023 | Aalto | B65D 43/16 |
| 2024/0053121 | A1* | 2/2024 | Searle | F41C 33/06 |

FOREIGN PATENT DOCUMENTS

| | | | | |
|---|---|---|---|---|
| JP | 2005329104 A | * | 12/2005 | |
| SE | 1250236 A1 | * | 9/2013 | F24F 13/20 |
| WO | WO-2005119139 A2 | * | 12/2005 | F24F 5/0042 |
| WO | WO-2019053520 A1 | * | 3/2019 | F24F 3/14 |
| WO | WO-2020198163 A1 | * | 10/2020 | F24F 5/0042 |

* cited by examiner

DEHUMIDIFICATION CONTAINER WITH LID POWER SUPPLY

FIELD OF THE DISCLOSURE

The subject matter of the present disclosure refers generally to storage containers, and, more particularly, to containers that are designed for high-humidity environments.

BACKGROUND

Humidity is one of the biggest dangers to items that are placed in storage. As moisture builds up within a storage area, pests may become attracted to the storage area and damage the items within. Further, mold and mildew can start to form on items in as little as 7-9 days if the relative humidity is greater than 85%. This may cause the materials to rot and decay over time, ruining the items placed in the storage area. Storage of material in coastal environments, such as at docks and marinas, is particularly plagued by high humidity due to the higher humidity of the environment, and the warm temperatures in addition to the high relative humidity of the air promotes even quicker growth of mold and mildew. In locations that are exposed to salt water, storage is further complicated by the presence of the salt, which can be highly corrosive to metals, particularly in humid conditions. The above issues may be further compounded if aquatic intended items, such as life vests or floatation devices, are placed in storage before having enough time to dry after exposure to water. In these instances it is critical to have some way to dry the items during storage. Accordingly, there is a need in the art for a system that can be used in highly corrosive and humid environments that removes humidity from a storage area.

SUMMARY

A system designed for storing materials in a high humidity environment is provided. The system is designed to remove humidity from a storage area so that items are not damaged by said humidity over time. In one aspect, the system removes humidity from the air within a cavity by sucking humidified air through an internal channel of the lid and distributing the humidified air to a dehumidifier where it is dehumidified. In another aspect, the system creates a seal between the lid and the body that prevents water from entering the cavity and damaging materials. Generally, the system is a storage container designed to protect materials within its cavity from water damage. Implementations of the present principles may include storage containers that may be used in humid and/or corrosive environments to protect their contents from damage. Such storage boxes may be used, for example, to provide convenient storage on a dock, improving the appearance of the dock by removing clutter. The storage boxes may also provide security for the owner's belongings, using the electric actuator to hold the lid closed when not in use. In some locations, for example where a marina's rules require on-dock storage, a storage box may be used to comply with such rules.

The system generally comprises a body, lid, and dehumidifier contained within the body. Intake fans are designed to pull humidified air from the cavity of the body and push said humidified air through internal channels and conduits that guide said air to the dehumidifier. The body and lid may furthermore be secured to one another, using powerful actuators to hold a lid of the container against a body of the container, and the body may be secured to a surface using anchors. Additionally, an emergency release switch positioned within the container may prevent users from being trapped inside the cavity. The dehumidifier may be powered by shore power, by integrated solar panels, and/or by any other appropriate source of electric power. The lid of a storage box may be powered or unpowered in its opening and closing. In the case of powered lids, automatic opening and closing functionality may be provided using an electric actuator that may be controlled wirelessly, or by a control on the storage box itself.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure. For instance, although the present embodiments are described with particular focus on use in a dock, marina, or similar shore or marine environment, one with skill in the art will understand that the system may be used to provide storage in any appropriate environment without departing from the inventive subject matter described herein.

DESCRIPTION OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
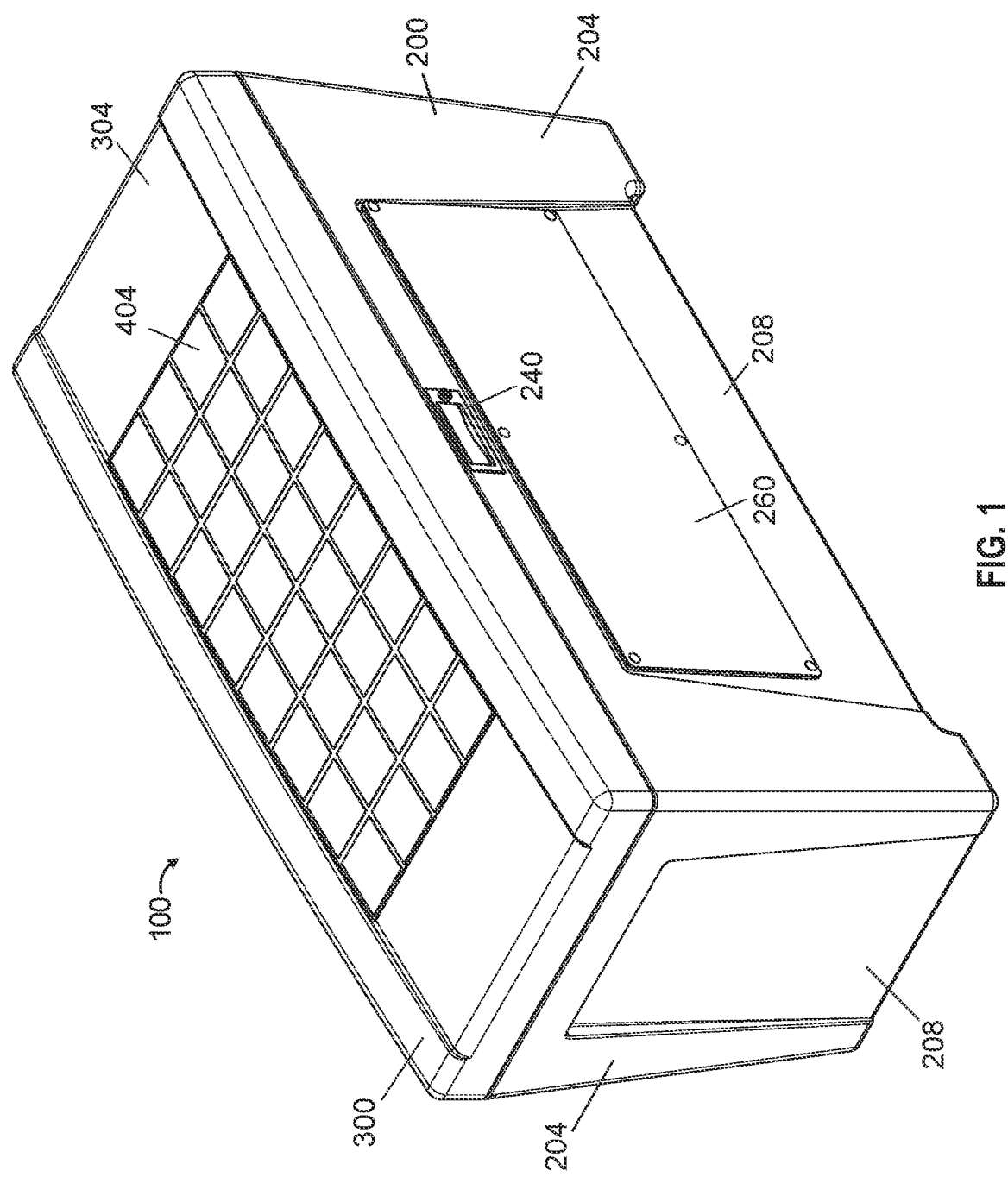
FIG. 1 shows an embodiment of a secure, self-powered, climate-controlled storage container embodying features consistent with the principles of the present disclosure.

As shown in FIG. 1, the system 100 generally comprises a container having a body 200, a lid 300, and a power supply. The body is formed by at least one sidewall 204 and defines a cavity between the sidewalls 204 and the base of the body. In some embodiments, as shown in FIG. 1, the body 200 and lid 300 are generally rectangular, having four generally straight sidewalls 204. In some preferred embodiments, the body 200 is tapered inwards towards the ground such that the top, open end of the container body is larger than the bottom end of the container body.

The side walls 204 of the container can include recesses or cutaway portions 208. The side recesses 208 can further include a vertical indention 212 on the top of the recess to provide an additional grip surface when lifting or moving the container. The corners and edges of the recesses 208, lid 300, and body 200 can be rounded or beveled to prevent sharp edges that could pose risk of injury during use in wet environments.

The body 200 can include feet 216 to raise the bottom of the container off the ground. This raised position can allow for water to exit the system 100 freely via a drain and/or a vent, as will be discussed further, below, and allows for air to flow under the container 100 to prevent water from pooling or becoming trapped between the bottom of the container and the ground.

Figure 3:
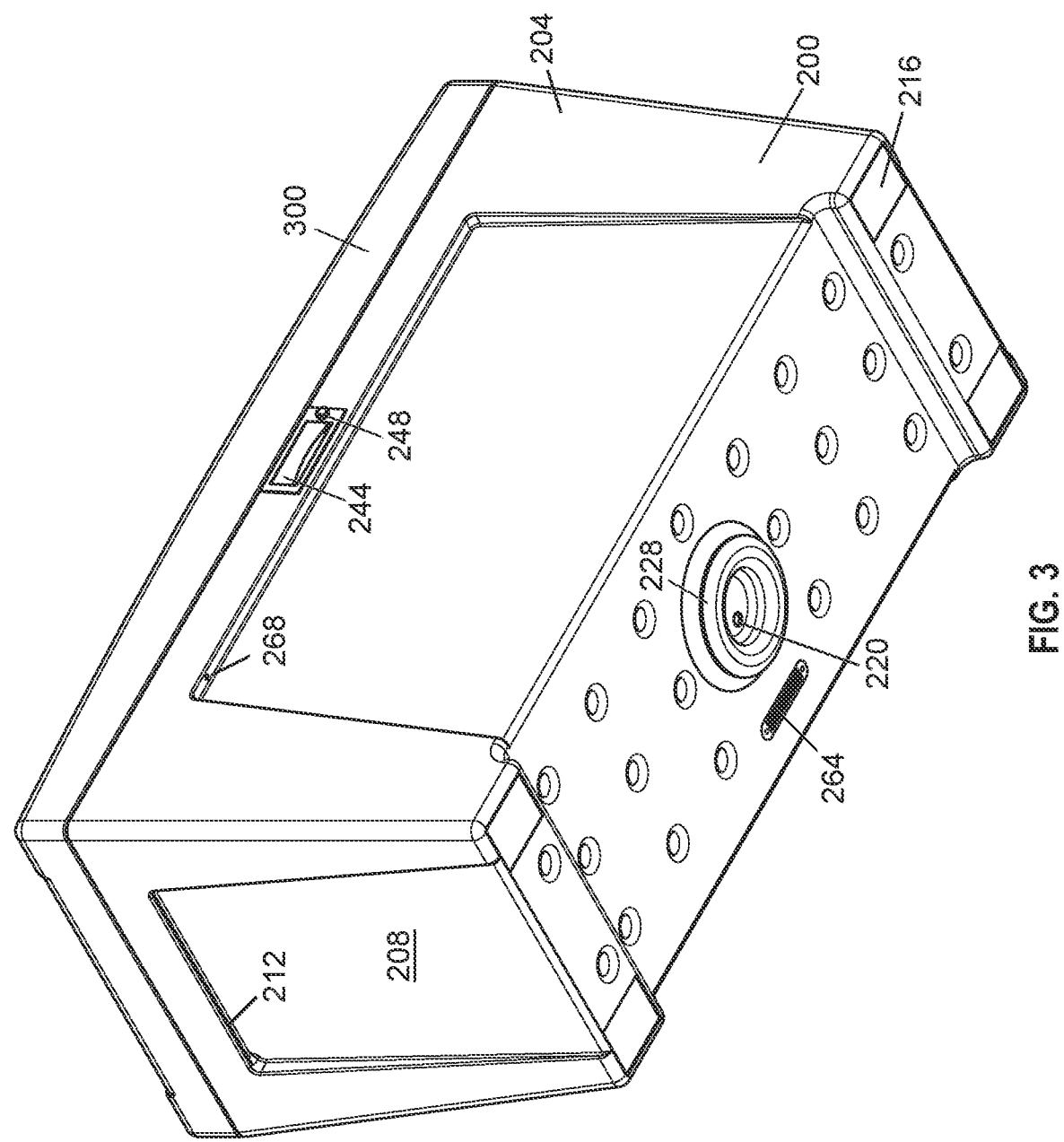
FIG. 3 is a bottom-front perspective view of a body of a storage container embodying features consistent with the principles of the present disclosure.
Figure 4:
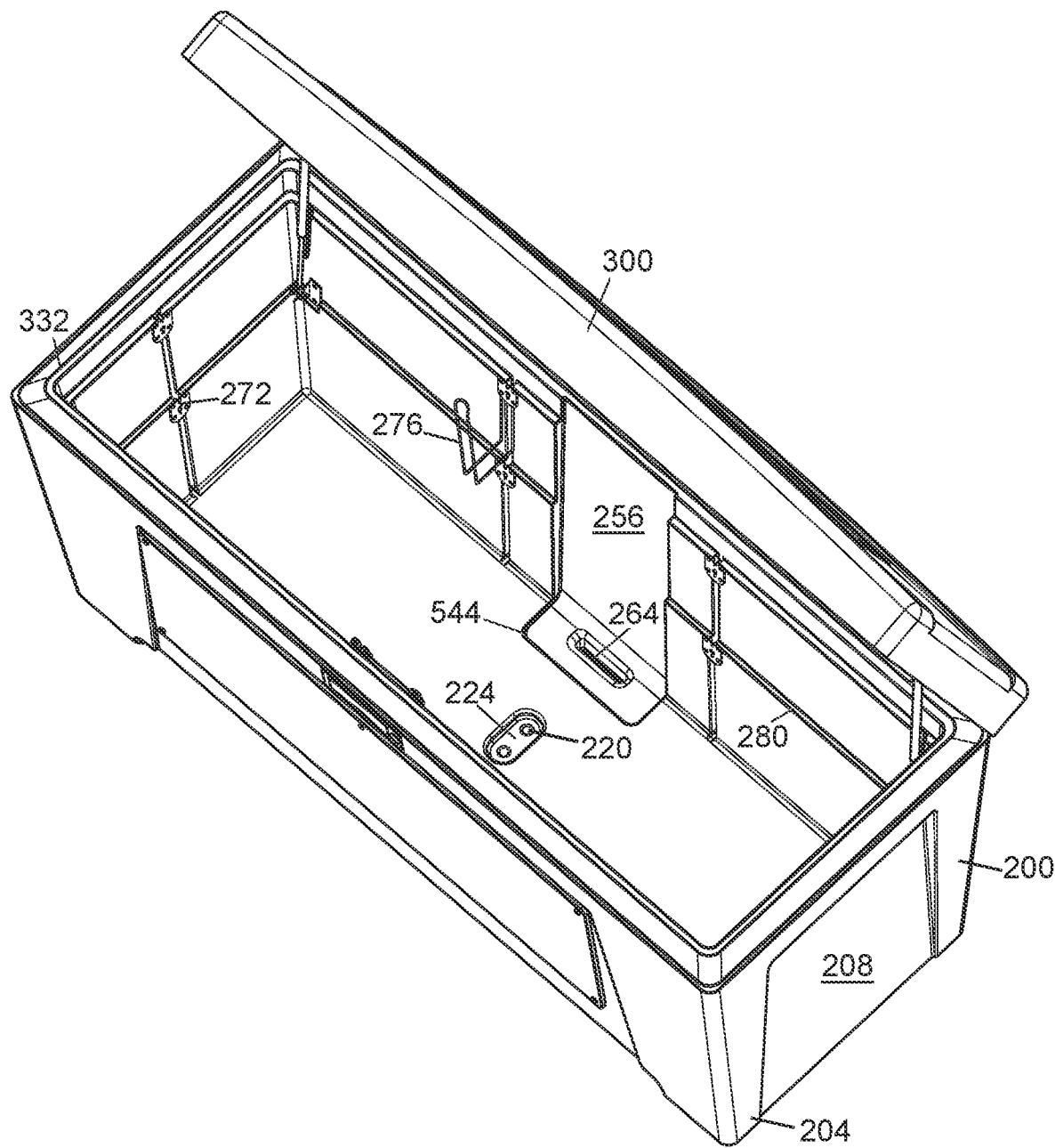
FIG. 4 is a top perspective view of an interior portion of a container embodying features consistent with the principles of the present disclosure.
Figure 8:
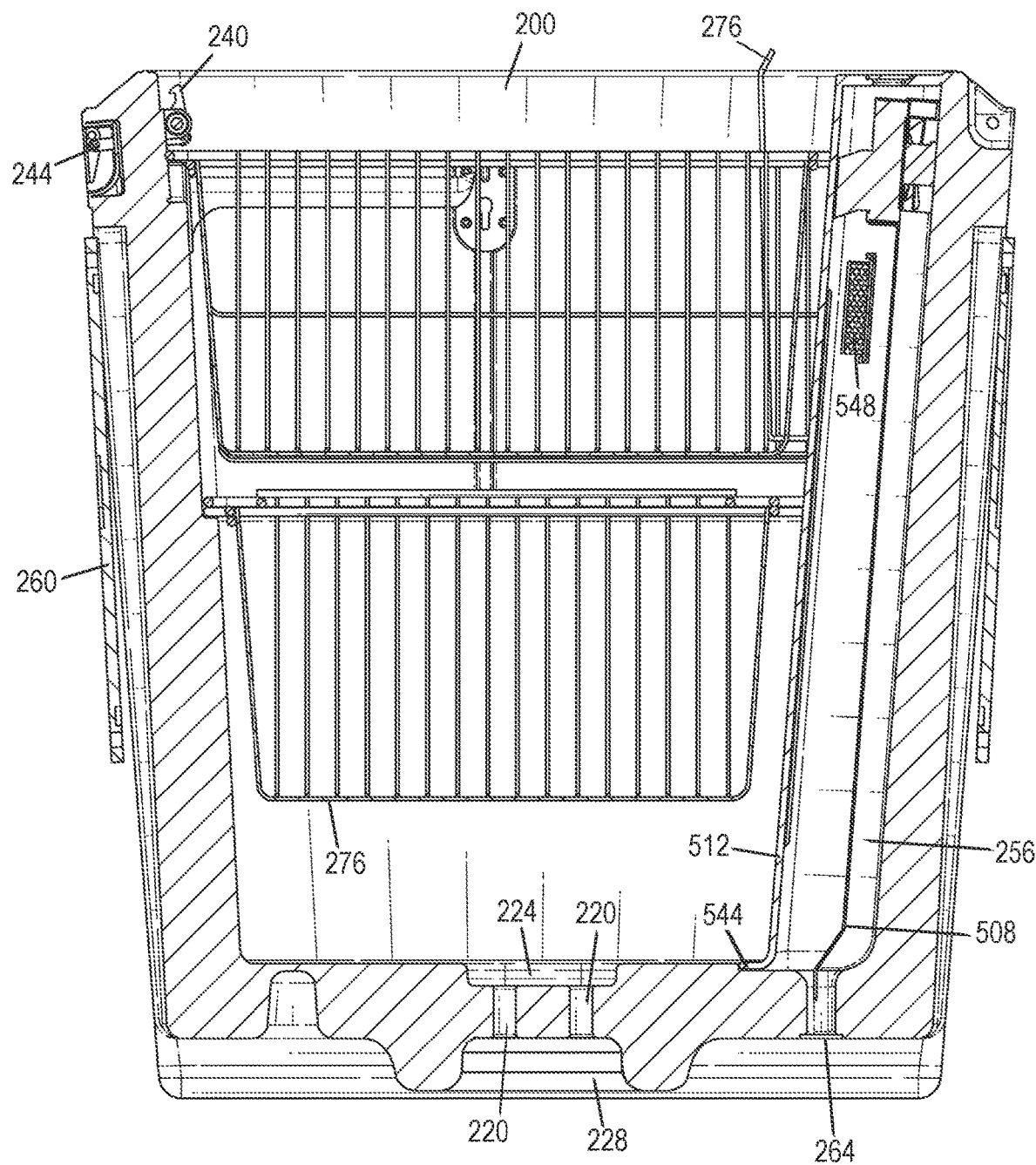
FIG. 8 shows a cross section of the body of the storage container shown in FIG. 7, taken along center line 8.

As shown in FIGS. 3 and 4, the bottom of the container body 200 can include a drainage hole 220 to allow water in the container to drip out of the system 100. The drain 220 can be located inside a recessed cup 224 in the floor of the container to further encourage water to exit the system 100 via the drain 220. Further, the bottom of the container can be configured to slope inwards towards the drainage hole 220 to prevent water from pooling on one end of the container. One or more drainage holes 220 can be present within the recessed cup 224. One hole can be used to install a locking bolt to anchor the container to the ground while the other hole can be used for drainage. Conversely, both holes can be used for drainage or for attaching a lock. Additionally, as shown in FIGS. 3 and 8, the exterior of the bottom can include a protruding exterior drain recess 228 to prevent the drainage holes 220 from becoming clogged and water backing up into the system 100. The exterior drain recess 228 can extend the same distance as the feet 216 or can be shorter than the feet.

The container can include one or more power supplies to power the electrical components of the container. The power supply may be any source of power that provides the system 100 with electricity. In one preferred embodiment, the system can comprise multiple power supplies to provide the system with power in different circumstances and use conditions. Specifically, the system 100 can be configured to use both a mobile power source 404 and a stationary power source 408. For instance, in one embodiment, the lid of the container includes a mobile power source in the form of a solar panel 404 that charges a battery 412 located inside an internal recessed portion 308 of the lid 300 and also includes a power interface 408 to allow the container to be plugged into a stationary power source. In some embodiments, the solar panel includes a weather resistant sealing and/or a coating to prevent water from infiltrating into the recessed portion of the lid.

Figure 5:
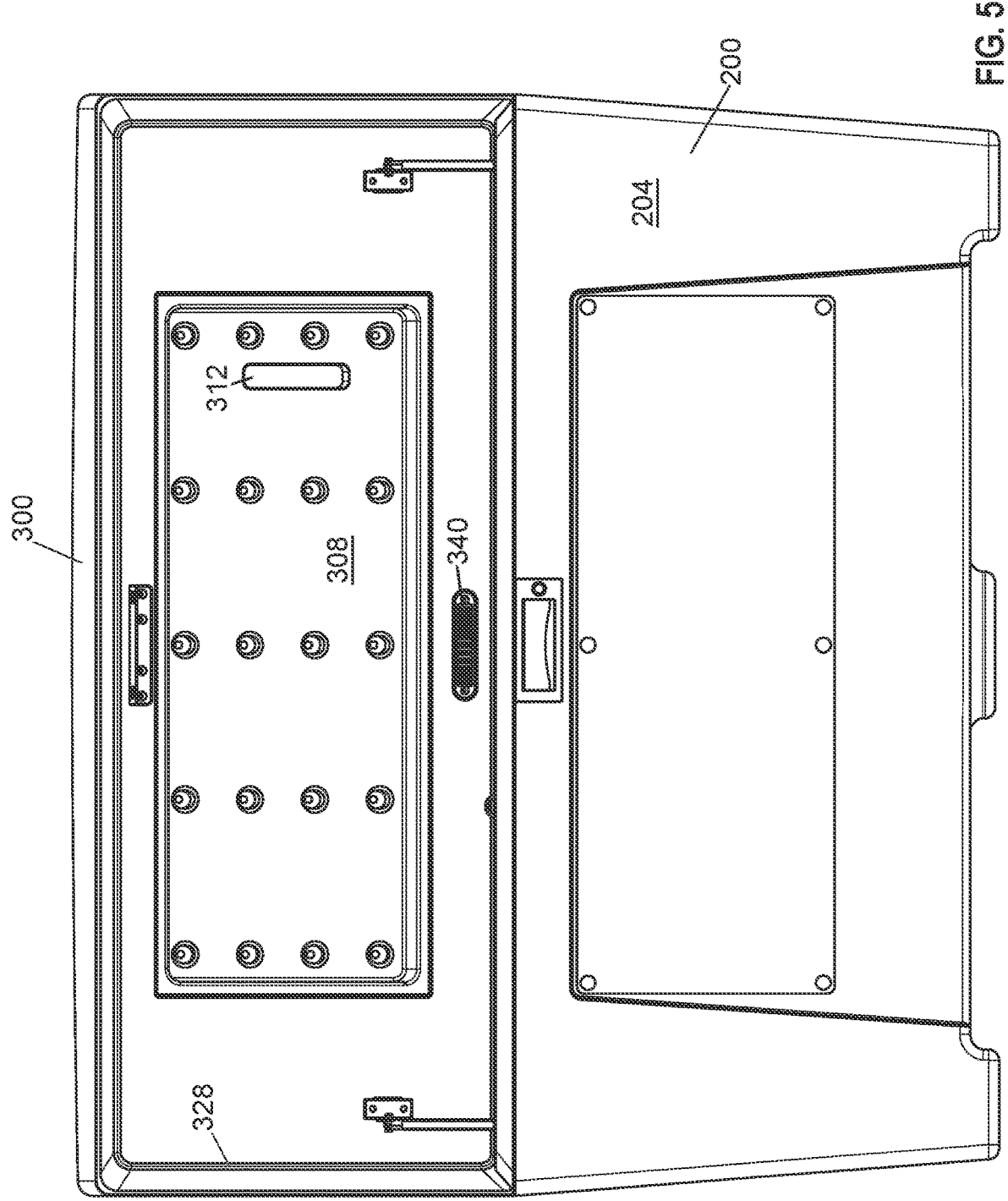
FIG. 5 shows a front view of the container and the lid having an interior space in the lid.

As shown in FIG. 1, the lid 300 can include an external recess 304 to house the solar panel 404 such that the solar panel is flush with the rest of the lid 300. Further, as shown in FIG. 5, the lid 300 can include a hole or port 312 to provide space for an electrical connection between the solar panel 404 and the battery 412.

Figure 6:
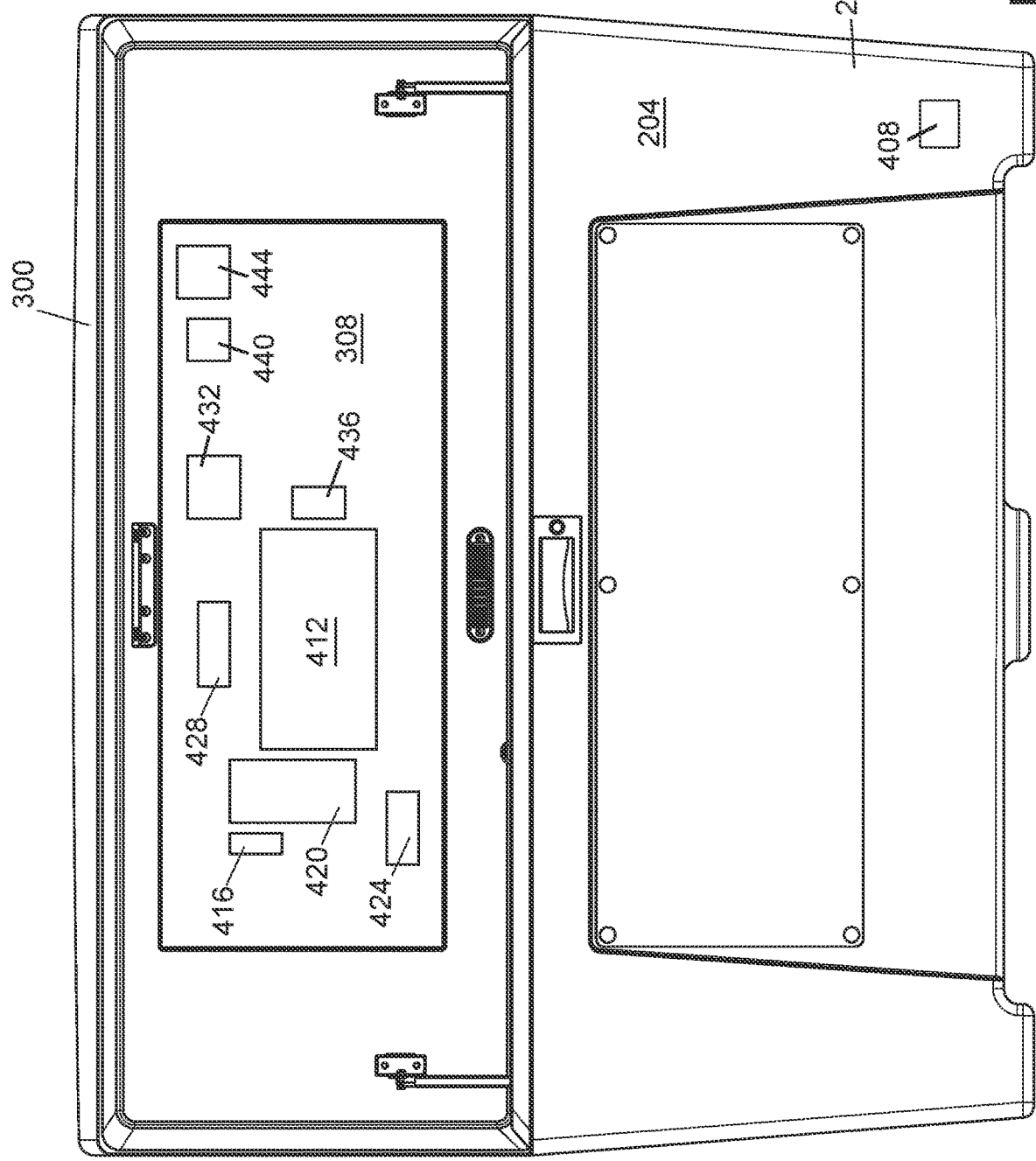
FIG. 6 shows a diagram of the interior space of the lid shown in FIG. 5.

The lid 300 can contain an internal compartment or recessed portion 308 to provide a housing for the electrical components. As shown in FIG. 6, the recessed portion 308 can house a battery 412, an LED controller 416, an AC voltage converter 420, a voltage regulator 424, a power bus 428, an actuator controller 432, a solar panel controller 436, a load control module 440, and a humidistat 444. In these embodiments, the battery 412 receives power from the solar panel 404 and or the stationary power source 408 and sends power to the other electrical components, such as the humidistat 444, LED controller 416, or actuator controller 432. These electrical components are located within the recessed portion 308 and are protected from exposure by the lid cover 316. Although these components are specifically contemplated and shown as being placed within the internal recess 308 of the lid 300, it should be understood that they can be placed in any appropriate space or spaces within the system 100, such as within one or more sidewalls 204 or the floor of the container.

The lid cover 316 can further contain a control panel 320 to allow a user to control different aspects of the system. For example, a user may control or program the lighting, set a desired humidity level of the container, or control the actuators 232 for the lid 300.

Power can be provided to the electrical components located in the body 200 of the container by leads which can exit the internal space 308 of the lid 300 via a lid port, which leads to an interior port of the body 200. The interior port of the body 200 allows passage of electrical and control leads from the lid port. The interior port may lead into the conduit or into an interior space of the sidewalls 204 of the body 200. In the depicted embodiment, power is routed through one or more of the hinges 236 to protect the electrical coupling from damage by exposure. Although not shown in detail, one with skill in the art will understand that control and power leads from the lid connect to their respective components in the body 200.

Electrical outlets can also be provided to allow charging of devices within the system 100, such as radios, flashlights, mobile computing devices, and other personal electrical or electronic devices. In some cases, cold storage can be provided, with the inclusion of a refrigeration unit, which may take up part or all the body 200.

Figure 2:
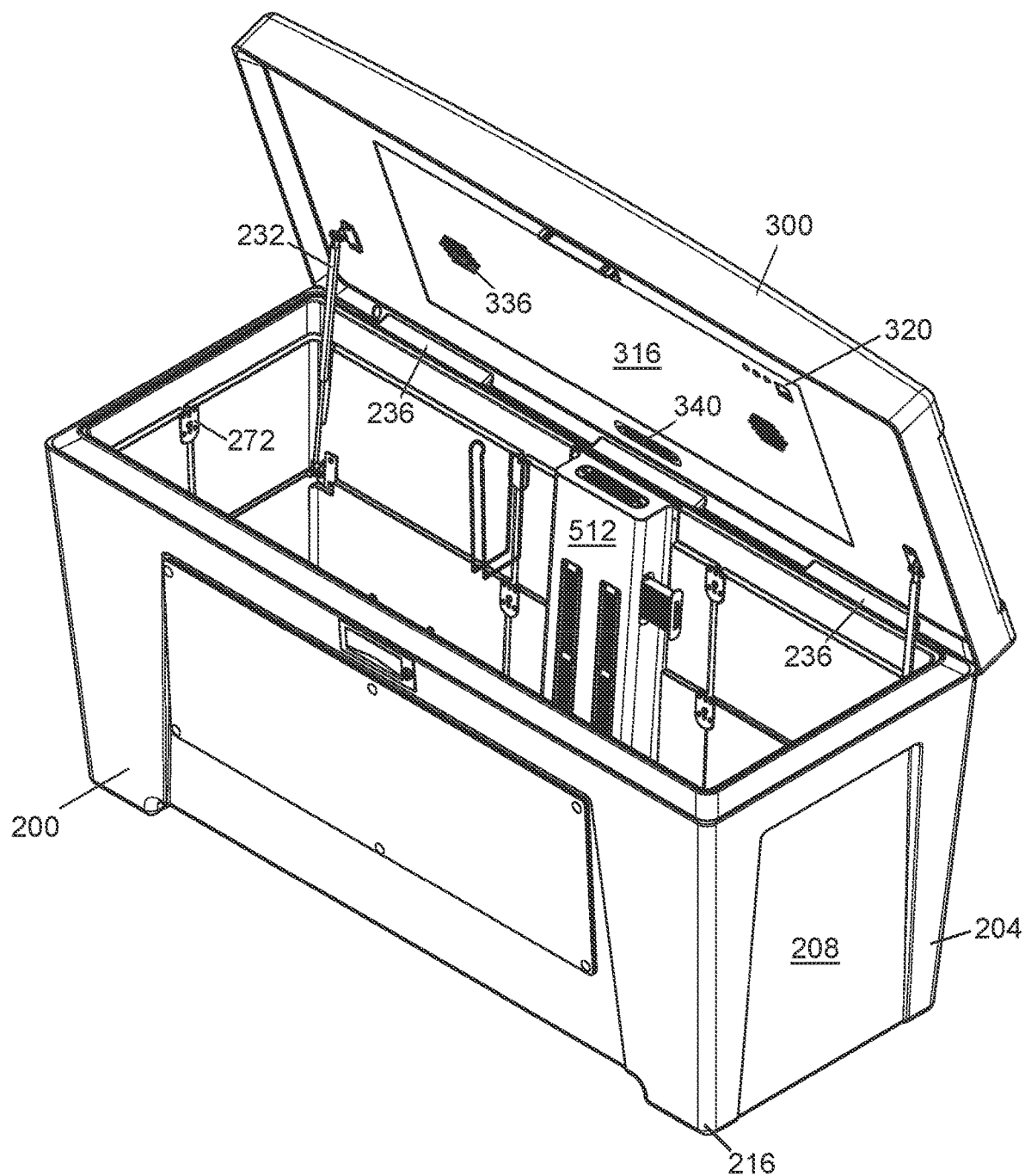
FIG. 2 shows an embodiment of a storage container having the lid open embodying features consistent with the principles of the present disclosure.

As shown in FIG. 2, the lid can include a hinge 236 and structural features to ensure a repeatable, effortless seal. Although a rigid mechanical hinge 236 is depicted, other attachment mechanisms such as a fully detachable lid and non-rigid hinge are contemplated.

As shown in FIG. 2, the lid 300 can be selectively opened and closed by actuators 232. The actuators 232 are attached to the underside of the lid 300 and to a surface of the body 200. The actuators 232 can be hydraulic pistons or other suitable mechanisms that are capable of selectively raising and lowering the lid 300. The actuator controller 432 powers and controls the actuators 232 to cause the actuators to raise or lower the lid. In one embodiment, a computer readable signal causes the arms of the actuator 232 to extend and press upward to raise the lid 300 or contract and pull downward against a surface of the lid to lower the lid. In these embodiments, the actuators 232 telescopically extend to raise the lid 300 into the open position and hold the lid open. To close, the arms of the actuators retract into themselves and are able to hold the lid 300 to the body 200 to prevent the lid from opening. In some embodiments, the actuators 232 can hold the lid 300 closed against an opening force to prevent unauthorized access to the container's contents. In some cases, the actuators 232 can hold their positions against a large amount of force to keep the lid 300 securely in place. In one preferred embodiment, each actuator 232 may be able to exert 1500 lbs of force, resulting in a total of 3000 lbs of force to lift or hold the lid in place. Although the depicted embodiment shows two actuators 232, different numbers of actuators 232 are contemplated. For example, some embodiments can only include a single actuator while other embodiments can include three or four actuators depending on the size of the lid. Further, although the depicted embodiment shows the actuators connecting to the rear wall of the body 200, the actuators can be placed on different surfaces, such as the front or side sidewalls 204, as needed.

In a preferred embodiment, the actuator controller 432 operates in response to a to a computer readable signal received via a wired/wireless interface. The wired/wireless interface can be a wireless remote control or fob configured to send a computer readable signal to a communication device, such as an antenna, of the actuator interface. Thus, the actuators 232 can be remotely controlled by the remote control. The remote control can include a signal sent by a phone to a receiver in the container, a Radio Frequency Identifier chip in a key or fob, a Bluetooth connection, or any other suitable electronic communication method. Thus, a user holding said wireless remote control or fob can trigger the actuator controller 432 from anywhere within wireless range. Alternatively, or additionally, the actuators 232 may be controlled by one or more actuator switches located on the inside and the outside of the lid. In some embodiments, the actuators 232 can be configured to detect when an unexpected resistance is present during opening or closing, and can automatically halt to prevent injury. Further, the lid cover 316 or the control panel can include an emergency open button on the interior of the container that opens the lid 300 to prevent a user from being trapped inside the container.

Some embodiments may further include security features that require certain conditions to be met prior to the lid opening. For instance, the lid can include a keypad that requires a code to be entered or biometric security features such as a fingerprint scanner that is configured to only open for authorized users. These security features may be required in addition to the remote access mechanisms discussed above or as alternative access methods that are independent of the remote access methods.

In other embodiments, the actuators 232 can be gas spring mechanisms. The gas spring closures can be passive and only provide a resistive force. For example, the actuators 232 can only hold the lid in the open position when the lid is fully open and provide resistance when the user closes the lid 300 to slow the lid's descent and prevent the lid from slamming and potentially damaging the mating faces 104 of the lid and the body 200.

In some embodiments, the lid 300 is secured to the body 200 via a latch 240 located on the body. The latch 240 is configured to hook onto a pin or bar in the lid 300 when the lid is shut, thus holding the lid to the body 200 when in the closed position. The user then pulls the handle 244 of the latch 240 to release the latch from the bar and raises the lid 300 to open the container. In some embodiments, the latch 240 can also include a lock 248 built into the latch 240 or can include additional hardware to attach a padlock or other aftermarket commercial lock. Some embodiments, as shown in FIG. 2, can include both a latch 240 and actuators 232. Other embodiments may only include a latch 240 or only include actuators 232.

Figure 14:
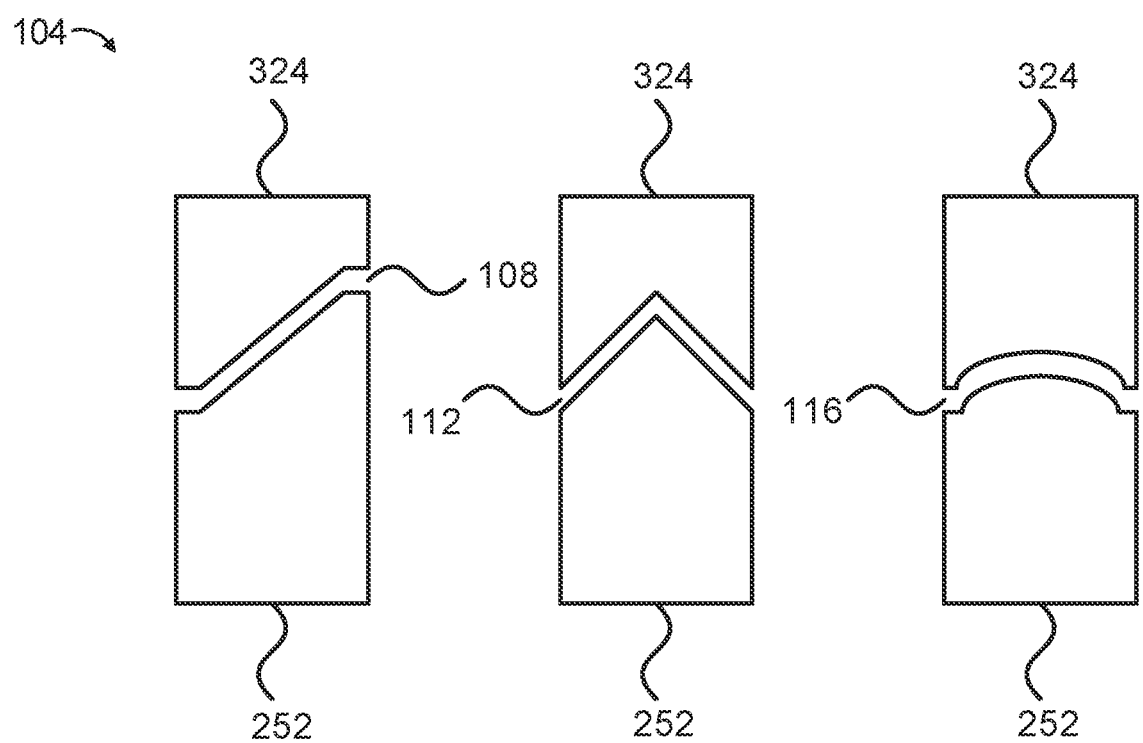
FIG. 14 shows cross sections of embodiments of the mating faces of the lid and body.

The mating faces 104 of the lid 324 and the body 252 can be configured to be water or splash resistant. As shown in FIG. 14, the mating faces 104 can form an externally sloped interface 108 to prevent water from infiltrating the connection and entering the container. In one contemplated interface 108, the exterior side of the connection is flat before sloping upwards towards the inside of the connection and then flatting out. Alternative embodiments may use a ridge 112 that is sloped on both ends or a curved interface 116 between the lid and the body 200 to prevent water infiltration.

In some preferred embodiments, a gasket 328 can be incorporated to further inhibit water from penetrating the connection 104 and reaching the interior of the container. In embodiments incorporating a gasket 328, the gasket can be located on the mating face of either the lid 324 or the body 252 of the container. In some embodiments, the gasket 328 is positioned inside a gasket recess 332 on one of the mating faces of the lid and body and the opposing face can include a ridge or other feature that is intended to compress the gasket 328 to provide increased water resistance. The gasket 328 can be incorporated into any of the contemplated mating faces 104 described above. Further, the gasket 328 can be composed of any suitable material such as rubber, silicone, plastic, or other compressible water-resistant material.

Figure 7:
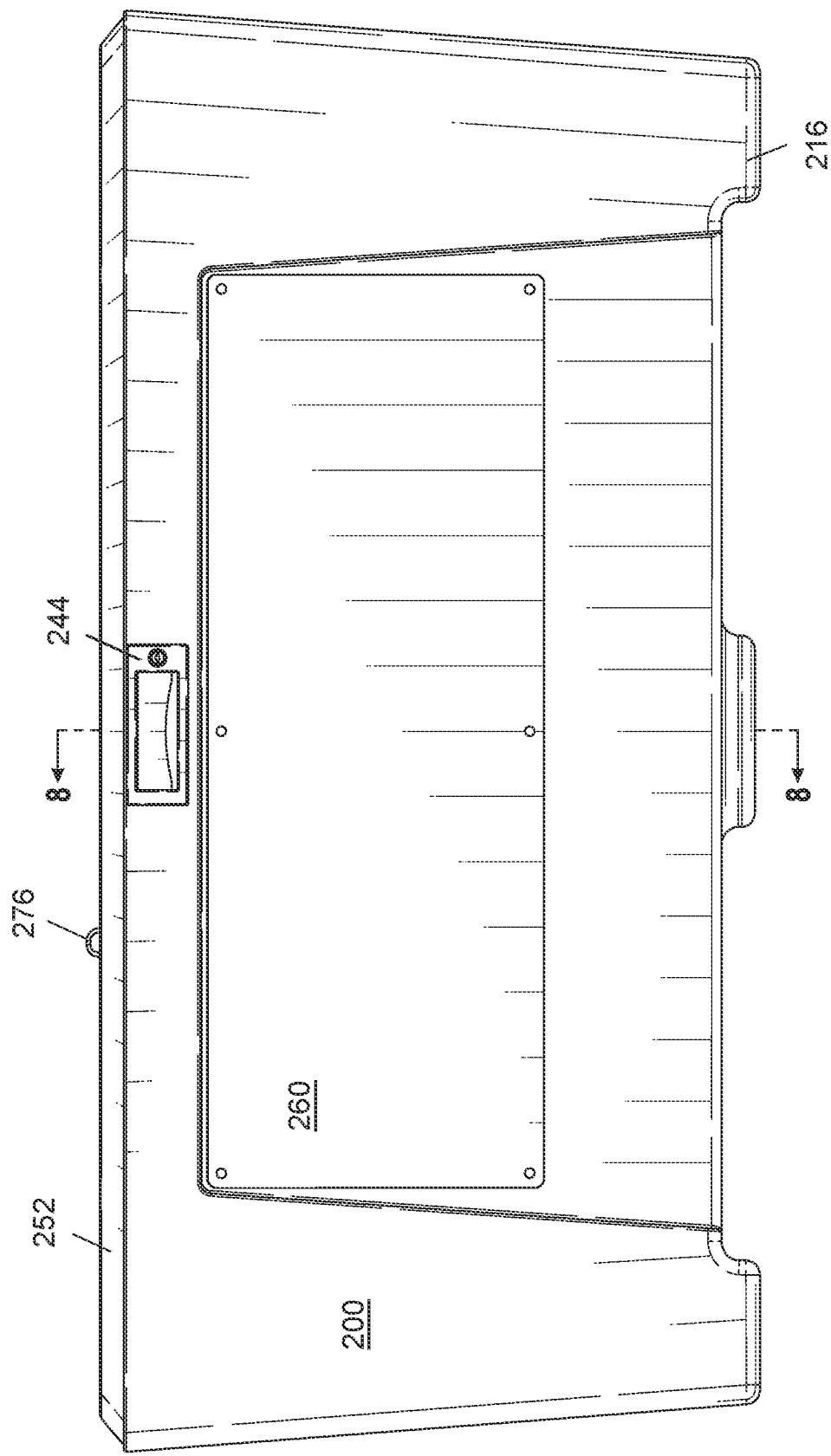
FIG. 7 shows a front view of a body of a storage container consistent with the principles of the present disclosure.

FIG. 7 shows an embodiment of the body 200 of the container, consistent with the principles of the disclosure. FIG. 8 shows a cross section of the embodiment of the body 200 shown in FIG. 7, taken along the center line 8 of FIG. 7.

The container includes a dehumidifier 500 to prevent items in the container from degradation due to wet storage and the growth of mold or mildew. In one embodiment, like that shown in FIGS. 2, 4, 5, and 8, the system 100 circulates air through a dehumidification circuit via an air conduit to provide dry air to the inside of the container and expel wet air into the external environment. In some embodiments, the air conduit includes a dehumidifier 500 and a dehumidifier cover that create an air current across the dehumidifier. In further embodiments, the air conduit includes a channel in the internal space 308 of the lid that is fluidly connected to a dehumidifier cover 516 and dehumidifier 500 to provide wet air to the dehumidifier 500 and return dry air to the container cavity.

In some embodiments, the system can be programmed to circulate air through the dehumidifier circuit using fans 504 until a desired humidity level has been achieved. Once the humidity level has reached the desired threshold, the intake fans 504 may reduce speed, or stop entirely, and the dehumidifier 500 may shut off until it is determined that the humidity level has once again risen above the threshold. In a preferred embodiment, the dehumidifier may operate by a Peltier process, but it should be understood that any appropriate dehumidification mechanism can be used without departing from the inventive subject matter described herein. In some cases, moisture that collects at the dehumidifier may drip down to the bottom of the system 100 and exit the system 100 via the one or more drainage holes 220. In other preferred embodiments, moisture can be actively removed from the system 100, for example via a pump.

In some embodiments, air circulation is achieved by a fan 504 located within the dehumidifier 500 as discussed below. In other embodiments, air circulation can be achieved by fans 504 located at the intake vents 336 on the lid cover 316 or at the return vents 516 on the dehumidifier cover 512. In some embodiments, air circulation is achieved by fans positioned at both the vents 336, 516 and the dehumidifier 500.

In a preferred embodiment, the dehumidifier circuit begins with one or more intake vents 336 located in the lid cover 316 that lead to a channel in the interior lid recess 308. As shown in FIG. 2, air from the container is pulled into the vents 336 and through a channel in the recess of the lid 308. The air then exits the lid channel through the lid exhaust vent 340. The lid exhaust vent 340 is configured to interface with a dehumidifier intake 520 located on the dehumidifier cover 512. This connection facilitates airflow between the lid recess 308 and the dehumidifier cover 512.

Figure 9:
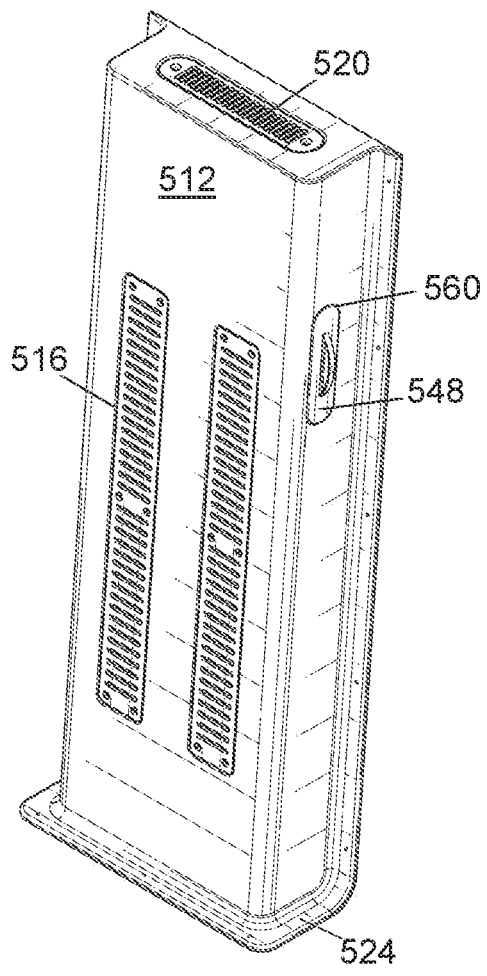
FIG. 9 shows an embodiment of a dehumidifier cover consistent with the principles of the present disclosure.

As shown in FIGS. 2, 4, and 8, the dehumidifier cover 512 is configured to be positioned around a dehumidifier recess 256 in the rear wall and bottom of the container body 200. As shown in FIG. 9, the dehumidifier cover 512 can include a flange 524 on the edges to form an air tight or air resistant connection between the body 200 of the container and the dehumidifier cover 512 to ensure efficient air flow through the dehumidification circuit. In some embodiments, the dehumidifier cover 512 is removably attached to allow the user to remove the cover for cleaning and maintenance. Further the dehumidifier cover 512 can include one or more return vents 516 on the front side of the cover to return the dehumidified air back into the container as discussed in greater detail below.

Figure 11:
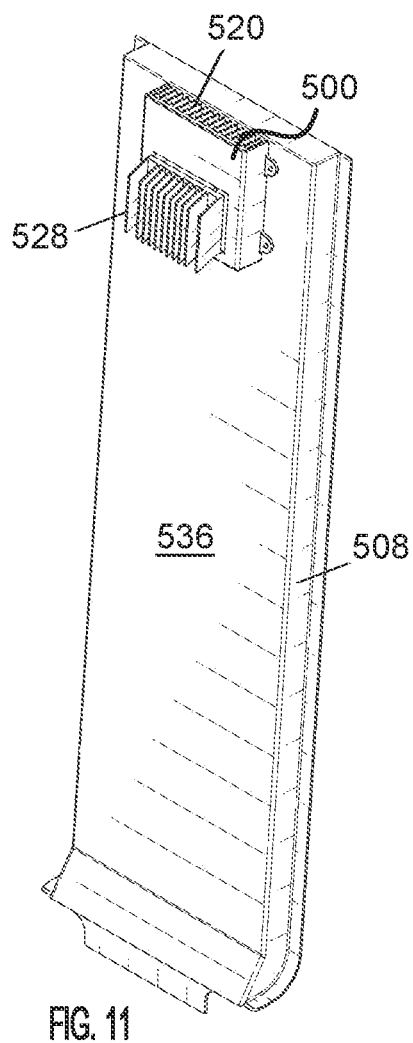
FIG. 11 shows an embodiment of a dehumidifier consistent with the principles of the present disclosure.
Figure 12:
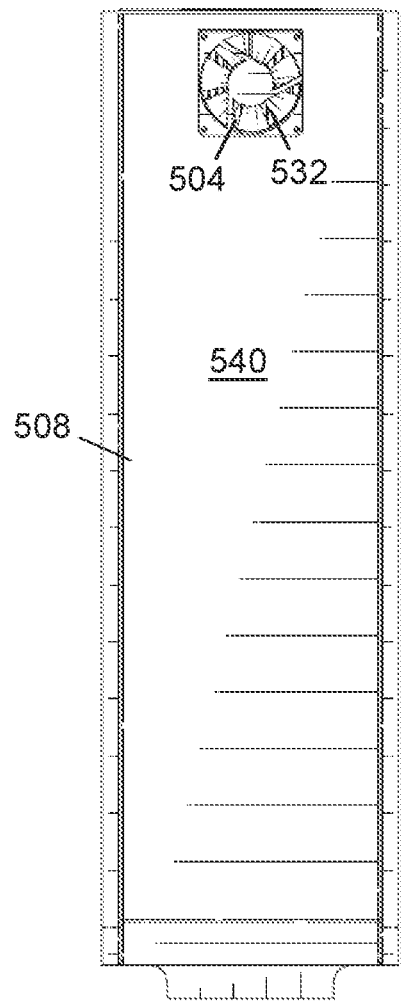
FIG. 12 shows the rear side of the dehumidifier shown in FIG. 11.

After the air enters the dehumidifier cover 516, it flows through the dehumidifier 500. As shown in FIGS. 11 and 12, the dehumidifier 500 is located on a baffle 508 and can contain an intake 520, a dry exhaust 528, a fan 504, and a wet exhaust 532. In one embodiment, the dehumidifier 500 is configured to pull air into the intake 520 by creating suction with the fan 504. The dehumidifier 500 then expels dehumidified dry air out of the dry exhaust 528 and wet humid air out of the wet exhaust 532. The baffle 508 separates the dry exhaust 528 from the wet exhaust 532 into two separate air currents, such that the dry exhaust is expelled into the front side of the baffle 536 and the wet exhaust is expelled on the rear side of the baffle 540.

The baffle 508 is configured to fit within a dehumidifier recess 256 located on the back wall 204 of the container body and creates an airtight or air resistant connection with both the container body 200 and with the dehumidifier cover 512 to prevent the expelled wet air from reentering the container after exiting the dehumidifier 500. In some embodiments, the dehumidifier cover 512 and the baffle 508 are selectively attached, such as by a slot 544 that the edges of the baffle 508 are inserted into; however, the baffle can be permanently attached to the dehumidifier cover 512 by permanent attachment means, such as adhesive, to provide an airtight seal. Some embodiments use a selectively removable connection, such as press tabs, to allow the user to remove the dehumidifier cover 512 and the dehumidifier baffle 508 from the container for cleaning and maintenance. In other embodiments, the dehumidifier baffle 508 and dehumidifier cover 512 are permanently attached to the container body 200.

After the air exits the dehumidifier 500, the dry air and the humid air are separated by the baffle 508. The dehumidified dry air flows through a dry air conduit or path defined by the dehumidifier cover 512 and the front side of the baffle 536. The dry air then returns to the inside of the container through return vents 516 located on the front side of the dehumidifier cover. Conversely, the humid air flows through an exhaust conduit or path defined by the container body 200 and the rear side of the baffle 540. The humid air then exits the system 100 through an exhaust vent 264 on the exterior of the container. As shown in FIG. 3, the exhaust vent 264 can be located at the back end of the bottom of the body 200; however, the exhaust vent 264 can be located on any suitable exterior surface without deviating from the disclosure, such as the rear wall 204 or the lid 300. Further, as shown in FIGS. 4 and 8, the exhaust vent 264 can be located at the bottom of an inclined or sloped section to prevent water from pooling in the exhaust channel near the exhaust vent 264.

Figure 10:
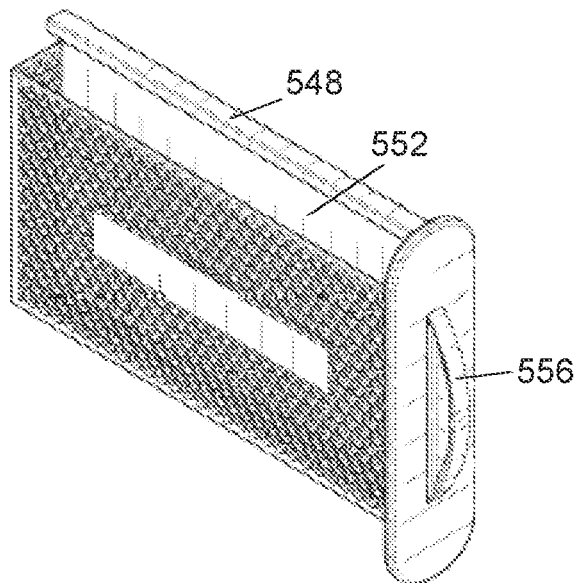
FIG. 10 shows a perspective view of a scent cartridge consistent with the principles of the present disclosure.

In some embodiments, the dry air flows through a scent cartridge 548, before reentering the container. As shown in FIG. 10, the scent cartridge 548 includes a chamber 552 to hold a scent producing compound and numerous holes or openings to provide ample surface area for airflow through the chamber 552. The air then flows through the holes and across the scent producing compound within the chamber 552, and then carries the scent into the container. In some embodiments, the scent cartridge 548 can be configured to hold odor fighting compounds that discourage the formation of offensive smells such as mildew. In still other embodiments, the scent cartridge 548 can be configured to hold an air filter to remove mold spores, pollen, and other air particulate matter from the system.

The scent cartridge 548 is designed to be selectively inserted into the dehumidifier cover 512 and contains a handle 556 for a user to grasp. In these embodiments, the dehumidifier cover 512 can further include a slot 560 for the scent cartridge 548 to be inserted into. The slot 560 is positioned such that scent cartridge is inserted into the air flow leaving the dehumidifier and reentering the container. This position ensures maximum exposure and dissemination of the scent compounds to the inside of the container. The scent cartridge can also include a flange to prevent over insertion of the cartridge 548 into the slot 560.

In other embodiments, there can be no baffle to provide separation between the wet air and the dry air that leaves the dehumidifier 500. In these embodiments, the dehumidifier 500 can simply remove moisture from the air as condensation and route all of the air back to the container compartment. The moisture is collected as condensation which then leaves the system 100 via the drain. These embodiments can also contain a scent cartridge 548 as discussed above positioned near the return vents 516 in the dehumidifier cover 512.

Some embodiments can contain a display plate 260 on one or more of the exterior side walls 204 of the body 200. In the embodiment shown in FIGS. 1 and 2, the display plate 260 is located within the recess 208 of the front exterior wall of the container and can be positioned out of the recess 208 on pegs. The display plate 260 can be spaced such that the plate is flush with the non-recessed surface of the side wall 204. The display plate can be altered to display a name, logo, or slogan as desired by a user. The system 100 can further include external lighting and the name, logo, or slogan can be cut or etched into the display plate 260 to allow the exterior lighting to shine through the cutaway portions and display the name or slogan in the dark. In some embodiments, the exterior lighting is located on the rear side of the display plate 260 between the plate and the recess of the sidewall 208. In some embodiments, a port 268 is provided for electrical cords or cables to provide power to the exterior lighting and other external electrical components. As shown in FIG. 3, the port 268 can be located on the underside of the recess in the sidewall 204. Although the port 268 is shown as being located on the underside of the front sidewall 204, any other suitable position can be used without deviating from the subject matter of the disclosure, such as on the underside of the container or on a different sidewall.

In addition to being located behind the display plate, exterior lights can be positioned on other surfaces of the container. For example, lights can be located beneath the container to provide light to the ground, or on the undersides of the recesses 208 of the exterior sidewalls 204. Exterior lights can also be positioned on the lid or within the exterior surfaces of the lid. Although the exterior lights are preferably light emitting diode "LED" lights, the exterior lights can be any suitable light source, such as incandescent bulbs without deviating from the subject matter of the disclosure.

Interior lights can be located at various positions within the container. For instance, lights can be located within the recessed portion of the lid behind the lid cover 316. In these embodiments, the lid cover 316 can be partially transparent to allow the light to penetrate through the cover and into the container. Alternatively, lights can be positioned within the intake vents 336 and provide light through the slots in the vents 336. Further, interior lights can be positioned in other areas of the body to provide light to the inside of the container, for example, interior lights can be located on the bottom floor of the container or the sidewalls 204 of the container. Although the interior lights are preferably LED lights, the interior lights can be any suitable light source, such as incandescent bulbs, without deviating from the subject matter of the disclosure.

The various internal and external lights are controlled by the LED controllers 416. The interior light controller controls the lighting of the lid and/or lighting within the cavity of the body 200 whereas the exterior light controller controls the intensity of the exterior lighting of the system 100. These LED controllers 416 can turn lighting on or off, dim or brighten lighting, and/or control the coloring of the lighting. For instance, the system 100 can be programmed to cause the lighting to emit a strong red light in a way that helps a user see without crippling their night vision. Lighting within the cavity is preferably turned on by the system 100 when the lid is opened. This can be accomplished by way of a switch that closes when the lid is in an open position thereby providing power to the internal lights.

In some preferred embodiments, sensors can be used to help the light controllers 416 to make decisions on how to manage lighting of the system 100. For instance, a tilt sensor of the lid 300 can be used to collect orientation data so that the system 100 can determine the position of the lid 300 and turn on lighting (such as LEDs) within the lid 300 or body 200 based on the position. In some preferred embodiments, sensors can be used to collect light data so that the system can determine the amount of ambient light (or other environmental factors) within the surrounding environment and adjust the amount of light the exterior lighting produces. Therefore, the interior light controller and exterior light controller can adjust the lighting of the system 100 to best fit the needs of a user at a given time depending on whether the lighting is currently being used and environmental factors affecting the user and system 100.

Figure 13:
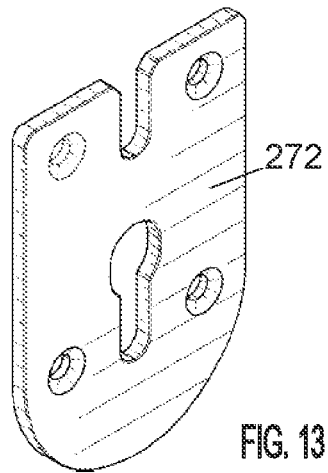
FIG. 13 shows an embodiment of a mounting plate consistent with the principles of the present disclosure.

The interior of the container can further include one or more mounting plates 272, as shown in FIG. 13, to allow the user to selectively insert storage dividers into the container. The system can include one or more tiers of mounting brackets 272 that interface with different styles of dividers 276. The mounting bracket 272 includes a slotted hole wherein a narrow slot extends downwards from a larger hole. The respective divider includes a pin with a protruding head that is wider than the slot of the mounting bracket but narrower than the hole such that the head may be inserted into the hole and dropped into the slot, wherein the head is held in the slot. The dividers 276 can include racks, rods, baskets, hooks, plates, or other types of storage dividers that can be inserted into the mounting plates to store various items. For example, a user can insert a hanger rod on one end of the container to hang up wet life vests on clothes hangers and insert a plate divider to store dry towels on the opposite end of the container. This system allows the user to quickly and easily configure the storage container.

Further, the system 100 can include one or more tiers of ridges 280 along the inner faces of the narrowing sidewalls 204 to allow a user to hang storage bins, shelves, or baskets to store items. These storage dividers 276 are sized such that the outer sides of the bins engage opposite ridges 280 on the sidewalls 204, such that the dividers cannot be rotated unless the dividers 276 are raised out of the container. This ensures the dividers will be securely held in place and cannot be knocked down accidentally. The dividers may be composed of wire to prevent water from pooling in the bins and degrading any items stored therein. Alternatively, some dividers may be solid material to prevent water from infiltrating the opposing side of the divider or from dripping onto items stored below.

Application Ser. Nos. 17/525,408 and 17/962,946 are specifically incorporated by reference in their entirety.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter can be made without departing from the principles and scope of the inventive subject matter.

What is claimed is:

1. A system for managing humidity level in a container comprising:
    a body having a cavity defined by at least one sidewall and a base,
        wherein said cavity contains an air conduit having a dehumidifier,
    a lid rotatably attached to said body,
        said lid having an internal space,
    a power supply configured to provide electrical power to said dehumidifier, and
        wherein said power supply is housed within said internal space of said lid,
    wherein the air conduit contains a baffle that separates air exiting the air conduit into a wet stream and a dry stream,
    wherein the system further comprises a fan configured to expel the wet stream from the system via an exhaust vent.

2. The system of claim 1, wherein the exhaust vent is positioned on a bottom of the body.

3. The system of claim 1, wherein the internal space of the lid contains at least one air inlet and at least one air outlet, that are configured to allow air to flow from the cavity, through the air inlet into the internal space, and from the internal space through the air outlet into the air conduit.

4. The system of claim 3, wherein the dry stream is returned to the cavity via return vents of the air conduit.

5. A system for controlling humidity in an enclosed space comprising:
    a body having a cavity defined by at least one sidewall and a base;
    a lid connected to said body and having an internal space and a cover plate;
    a dehumidifier positioned within an air conduit disposed within said cavity; and
    a power source housed within said internal space and providing electrical power to said dehumidifier; and
    a scent cartridge,
    wherein the air conduit contains a baffle that separates air exiting the air conduit into a wet stream and a dry stream,
    wherein the dry stream is contained within a dry stream conduit and returned to the cavity via a return vent,
    wherein the wet stream exits the system via an exhaust vent,
    wherein the system further comprises a fan configured to expel the wet stream from the system via the exhaust vent, and
    wherein the dry stream conduit contains a slot that is configured to accept the scent cartridge.

6. The system of claim 5, wherein the dehumidifier is positioned within a dehumidifier cover mounted on the at least one sidewall of the cavity.

7. The system of claim 5 further comprising a depression in the base of the body, said depression having at least one hole.

8. The system of claim 5, further comprising a gasket positioned at an interface between the lid and the body.

9. The system of claim 8, wherein the lid contains a recess that houses the gasket to form a water resistant interface when said lid is closed to said body.

10. The system of claim 5, further comprising:
    a solar panel positioned on a recess in a top surface of said lid; and
    wherein said power supply is a battery that is configured to be charged by said solar panel.

11. A system for managing the humidity level in a container comprising:
    a lid having an internal space covered by a cover plate;
    a body having a base and at least one sidewall protruding from said base defining a cavity within said body;
    an air conduit positioned on the at least one sidewall;
    a dehumidifier positioned within said air conduit; and
    a power supply located within said internal space configured to power said dehumidifier,
    wherein the air conduit contains a baffle that separates air exiting the air conduit into a wet stream and a dry stream, and
    wherein the system further comprises a fan configured to expel the wet stream from the system via an exhaust vent.

12. The system of claim 11, further comprising:
    an air inlet in said cover plate configured to allow air to flow from the cavity to the internal space;
    an air outlet in said lid configured to allow air to flow from said internal space to an inlet of said air conduit; and
    a return vent on said air conduit to allow air to flow from said inlet, through the dehumidifier, and back to the cavity through said return vent.

13. The system of claim 11, further comprising at least one mounting plate configured to engage an end of a storage divider.

14. The system of claim 13, wherein the at least one mounting plate is comprised of at least a first set and a second set of mounting plates;
    said first set of mounting plates is positioned at a first height within the cavity; and
    said second set of mounting plates is positioned at a second height within the cavity.

15. The system of claim 11, in which an external face of the at least one sidewall has at least one recessed portion.

* * * * *